Figure 1:
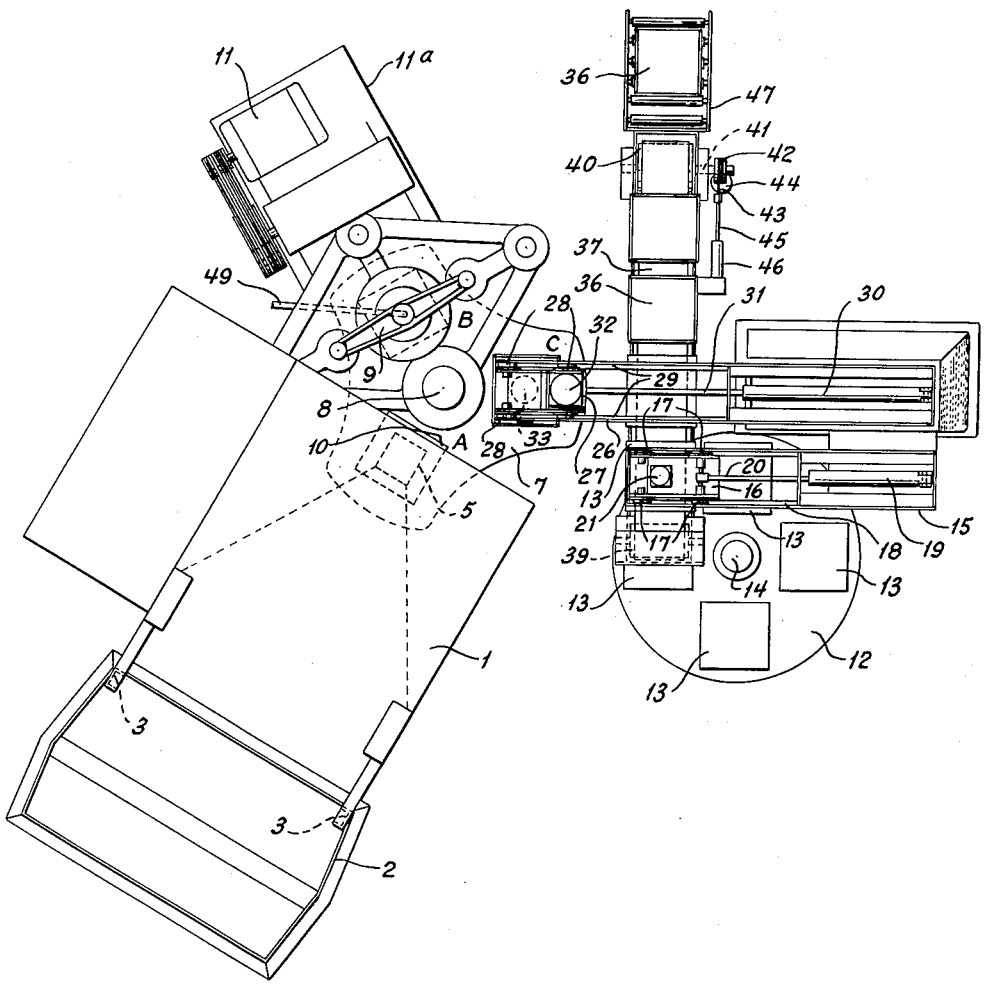

Nov. 21, 1961     N. A. HELLSTRÖM     3,009,228
MACHINES FOR THE MANUFACTURE OF SLABS OF
CONCRETE OR SIMILAR CASTING MASSES
Filed Sept. 26, 1958     3 Sheets-Sheet 1

INVENTOR.
NILS ARNE HELLSTROM
BY
ATTORNEY.

Nov. 21, 1961  N. A. HELLSTRÖM  3,009,228
MACHINES FOR THE MANUFACTURE OF SLABS OF
CONCRETE OR SIMILAR CASTING MASSES
Filed Sept. 26, 1958  3 Sheets-Sheet 3

INVENTOR.
NILS ARNE HELLSTROM
BY
ATTORNEY.

United States Patent Office 3,009,228
Patented Nov. 21, 1961

3,009,228
MACHINES FOR THE MANUFACTURE OF SLABS OF CONCRETE OR SIMILAR CASTING MASSES
Nils Arne Hellström, Uppsala, Sweden, assignor to Aktiebolaget S:T Eriks Lervarufabriker, Uppsala, Sweden, a corporation of Sweden
Filed Sept. 26, 1958, Ser. No. 763,649
1 Claim. (Cl. 25—2)

The present invention relates to an arrangement in machines for the manufacture of slabs of concrete or similar casting masses. The main object of the invention is to automatize the manufacture as far as possible so that the least possible manual work is required.

The machine comprises a mold table rotating stepwise and having a number of molds for the casting of the slabs, said molds being movable by said table in succession to a filling station, in which the casting mass is supplied, a pressing and dehydrating station in which the casting mass in the mold is compressed and dehydrated, and a discharge station in which the pressed concrete slab is removed from the mold. In addition the machine comprises a first conveying means adapted to move stepwise for conveying the slabs from the machine plant, synchronously with the rotation of the mold table, a second conveying means, likewise adapted to move stepwise synchronously with the rotation of the mold table, for conveying supporting discs from a store or pile of such discs to said first conveying means, and a third conveying means likewise moving in synchronism with the rotation of the mold table, for transferring the cast concrete slab from the mold table to a position on such a supporting disc on said first conveying means.

The main characteristic feature of the invention resides in the fact that the first conveying means which moves forward stepwise is arranged laterally of the mold table and the store or pile of supporting discs, and that the second conveying means for transferring supporting discs and concrete slabs to the first conveying means is adapted to carry out movements in a vertical as well as in a horizontal direction under the action of pneumatic or hydraulic mechanism, for example.

It is known in itself to manufacture bricks and such like in a machine having a rotating mold table with molds arranged therein. These molds consist of apertures which pass right through the mold table and are closed on the lower side by special, removable arrangements. The bricks which are prepared in the molds are removed from the molds by a downward movement and fall on to a conveyor track arranged beneath the mold table. Supporting discs are transferred to this conveyor track at another point from a store including a pile of such supporting discs arranged above the conveyor track. Thus, in this arrangement the conveyor track is arranged underneath both the mold table and the store of supporting discs. This entails a disadvantage as the heavy mold table and store track supporting discs must be raised above the conveyor which should be arranged on a convenient working level, or slightly above such a level so that the slab units transported on the track can roll off on to a rolling conveyor under the influence of the force of gravity. Placing of heavy arrangements such as the mold table and the store of supporting discs at a considerable height entails the installation of costly structures. In addition to this there is the disadvantage that the casting mass which is to be transferred to the molds in the table must be transported up to a considerable height and that also the supporting discs used must be transported up to a corresponding high level.

As distinguished from said known arrangement the main object of the present invention is to provide a conveyor which moves stepwise and is arranged entirely laterally of or alongside the rotating mold table and the store of supporting discs. By arranging the machine in this way the constructive problems for supporting the mold table and the store of discs can be solved in a comparatively simple manner and as a consequence thereof the machine will be considerably cheaper. The machine will be cheaper to run as a reduced amount of power will be required for transporting the casting mass intended for the casting to a container placed above the mold table, and to convey correspondingly the supporting discs back to the store from which they have been taken.

Figure 2:
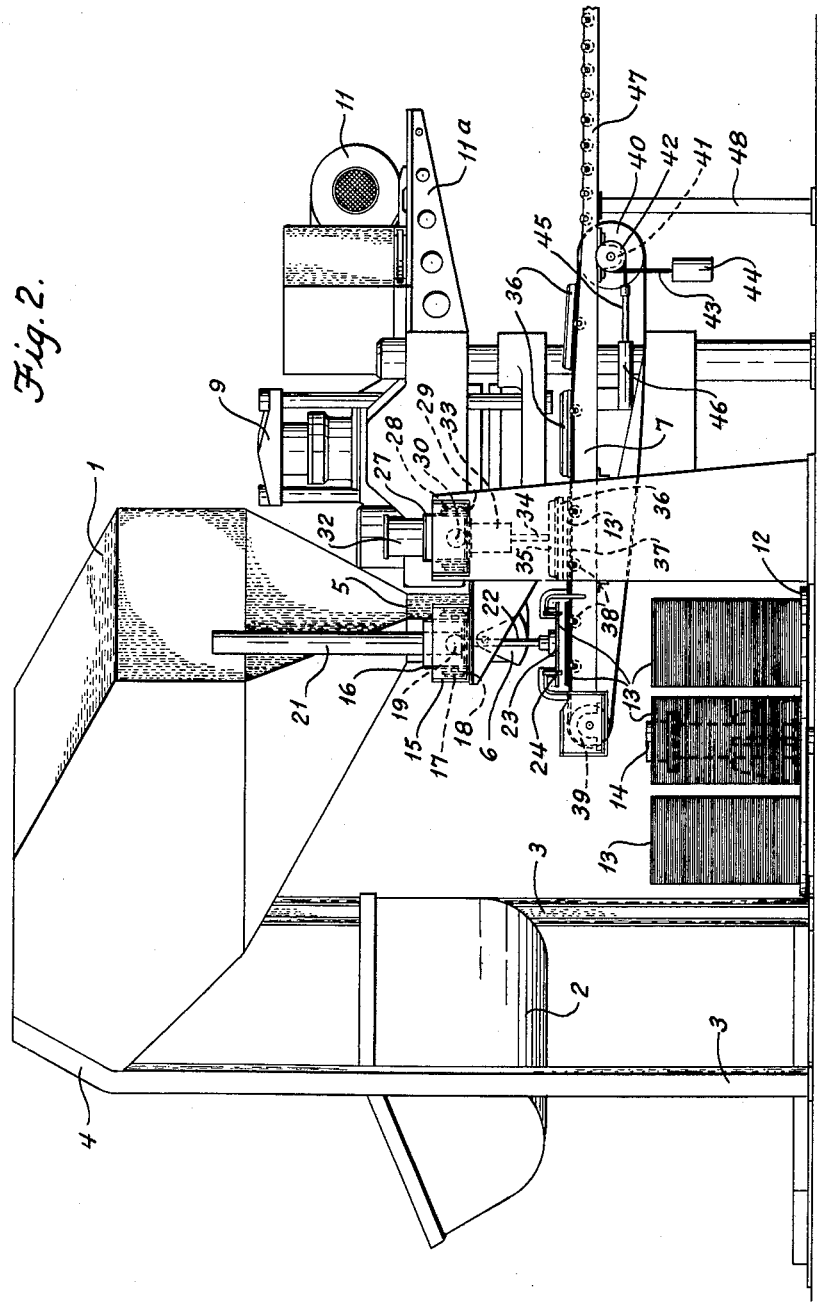
Figure 3:
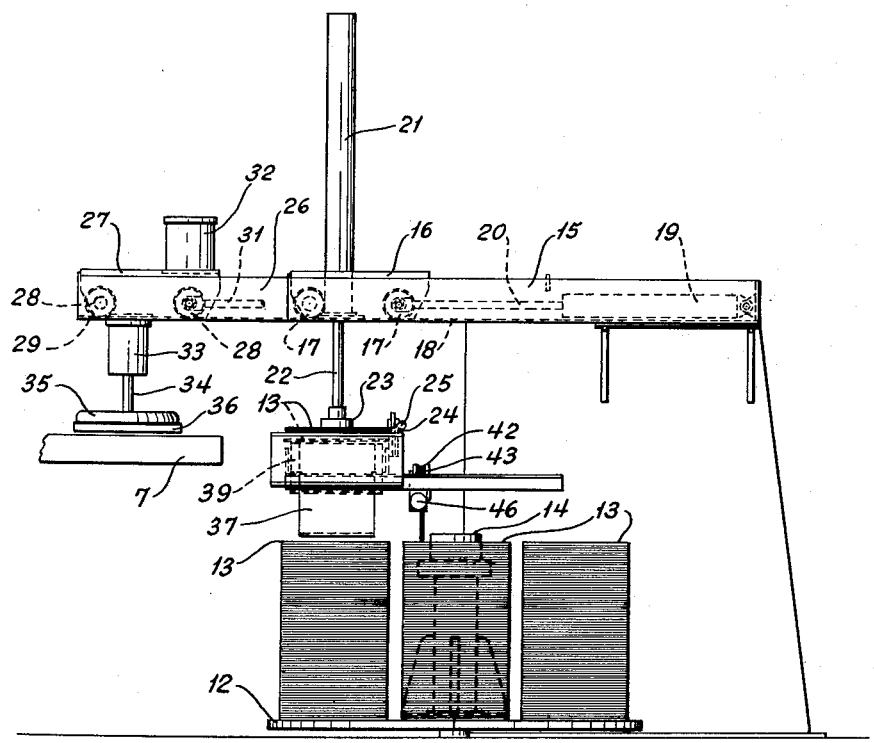

One embodiment of a machine according to the invention is shown in the accompanying drawing, in which FIGURE 1 is a horizontal view of the most important parts of the machine,
FIGURE 2 is a side view and
FIGURE 3, another side view seen at right angles to FIGURE 2.

The machine mainly comprises a rotating molding and pressing table 7 adapted to rotate stepwise, arrangements 1 for the supply of concrete mixture to molds 10 on or in this table, a press, arrangements 35 for removal of ready-pressed concrete slabs 36 from the mold table 7 and for transferring such slabs to a main or first conveyor 37 moved stepwise, and also a second conveyor 23 for the supply of supporting discs 13 on to said main conveyor 37, so that the supporting discs will act as supports for the concrete slabs on the conveyor 37. All these mobile devices are synchronized with one another and with the stepwise movement of the mold table.

The concrete mixture is contained in a container 1 to which it is conveyed from a suitable mixer by means of a bucket 2, or such like, which is vertically movable on a stand 3 and tiltable around a horizontal axis. The bucket is tilted at the open end 4 of container 1. The concrete container 1 is provided at the bottom with a discharge port 5 controlled by a suitable valve arrangement. From the discharge port the concrete mixture runs down in predetermined portions or batches into a molding cavity or recess 10 (FIGURE 1) on the rotating mold table 7. According to the embodiment shown the mold table has three such molds 10, but the invention is, of course, not limited, to this number.

Every molding cavity 10 has a shape corresponding to the desired shape of the concrete slab which is to be manufactured. An oscillating basin 6, or such like, is suspended below the discharge port 5 to collect the small remaining quantities of concrete which may happen to run out through port 5, immediately after this has been closed.

Table 7 rotates round a vertical shaft 8 and is rotated stepwise by means of a mechanism, not shown, which is driven from a motor 11 mounted on a bracket 11a, so that mold 10 which is in position A for filling right below the discharge port 5 is passed, once it has been filled, to the next station which is a pressing and dehydrating position B (FIGURE 1) in which the concrete mixture is subjected to appropriate pressure by a pneumatic or hydraulic piston or stamp. A pipe 49 for supply of compressed air can emerge close to the lower surface of the piston so as to facilitate the removal of the discharged water. The pressing mechanism is mounted on a stand 9 and is synchronized with the stepwise movement of the mold table.

After completion of the pressing operation the mold table is moved forward one step in the same direction to position C, in which the pressed concrete slab is removed. This is effected by a mechanism including a suction plate 35 having suction holes or suction channels in its lower surface. The suction holes are connected with a vacuum arrangement, for example comprising a piston pump 32. The suction plate 35 is fixed to a vertical piston rod 34 (FIGURE 3) the other end of which is connected with a piston adapted to operate in a hydraulic or pneumatic cylinder 33 so that the suction plate can be moved down to engage the concrete slab 36, and so as to grip the latter by suction and then be raised together with slab 36. The cylinder is attached to a carriage 27 which can travel in a horizontal direction by means of wheels 28 in guides 27 on horizontal girders 26, which are supported like cantilevers in a frame.

Carriage 27 is connected to a piston-rod 31, the other end of which is connected to a piston in a hydraulic or pneumatic cylinder 30 (FIGURE 2) so that carriage 27, and consequently also suction plate 35, can be moved horizontally from the position directly above concrete slab 36 on mold table 7 to a position exactly above the conveyor 37 on which the concrete slab can be laid after lowering suction plate 35 and disconnecting the vacuum source from said suction plate. The suction plate can then be returned in an analogous manner to the mold table to fetch a new concrete slab. It is not advisable, however, to put the concrete slab directly on conveyor 37 but an intermediary supporting disc 13 of sheet metal, for example, should first be laid on the conveyor so as to serve as support to the concrete slab, thus facilitating the subsequent handling of the latter. Discs 13 are stored in a number of piles (in the embodiment shown four piles) on a turntable 12 revolving round a shaft and are picked up one at a time by means of a special lifting or hoisting mechanism. If discs 13 consist of magnetic material this mechanism may, for example, comprise a permanent magnet 23 attached to one end of a vertical piston rod 22, the other end of which is connected with a piston which operates in a hydraulic or pneumatic cylinder 21. The cylinder is carried by a carriage 16 (FIGURE 3) having wheels 17, by which it can travel on guides 18 in horizontal girders 15 mounted on a stand. Carriage 16 is connected to one end of a piston rod 20, the other end is connected with a piston in a hydraulic or pneumatic cylinder 19, so that carriage 16 with magnet 23 can be moved from a position immediately above one of the piles of discs 13 to a position immediately above conveyor 37. In the first-mentioned position magnet 23 is first lowered sufficiently for engaging the uppermost disc 13 in the pile, so that this slab will be attracted by the magnet so as to accompany it on the magnet being raised.

When magnet 23 and disc 13 adhering thereto are raised high enough carriage 16 is moved outwards towards conveyor 37, where disc 13 first sweeps aside two abutments 24 (FIGURE 2) placed at the side of conveyor 37 and turning round pivots 25 in one direction only, these abutments on the return movement of magnet 23 and carriage 16 to their starting position being adapted to engage disc 13 so as to strip it off or release it from magnet 23, as abutments 24 are now prevented from rotating in the direction of movement of the disc 13. Disc 13 which is thus released is deposited on conveyor 37 and is conveyed below the travelling track of suction plate 35 when conveyor 37 is subsequently moved one step forward. Concrete slab 36 which is transported by suction plate 35 is thus caused to rest on the disc 13. Abutment 24 can be turned round pivots 25 so that they can be swung aside so as not to obstruct the movement of disc 13 in the direction towards the conveyor 37. Conveyor 37 consists of an endless belt, for example, which is supported on rollers 38 (FIGURE 2) and runs around end rollers 39, 40, of which roller 40 drives the belt stepwise in one direction by means of a piston rod 45, one end of which is connected with a chain or cable 43 laid round and driving a one-turn coupling 41, 42 adapted to rotate one revolution for each actuation and connected with the roller 40. One end of the cable is connected with a piston in a hydraulic or pneumatic cylinder 46, while the other end of cable 43 carries a weight 44 which pulls back the one-turn coupling without carrying the roller 40 with it on every revolution in the driving direction which is effected by piston rod 45 via cable 43 and the one-turn coupling.

The concrete slabs which are moved forward on conveyor 37 and rest on discs 13 are conveyed from the conveyor to a roller-way 47, or such like, to be transported by this to drying and steam hardening chambers etc. When the treatment of the concrete slab has been completed discs 13 are returned to the piles of the turntable 12.

According as these piles are emptied table 12 is turned one step so that the next pile is moved to a new position below magnet 23.

The phases described for the various apparatus of the machine are synchronized with one another by means of a central operating mechanism of a known kind. This can consist of a set of valevs which control the supply and discharge of the pressure medium to and from the respective operating cylinders in a certain rhythm depending on the stepwise movement of the mold table 7.

Molds 10 may have perforated bottoms to facilitate drainage of water from the concrete mass. A sheet of water-permeable paper, or the like, may appropriately be placed at the bottom of the mold and on the top of every batch of concrete mass supplied into the mold, to drain off the water.

The invention is not restricted to the embodiment now shown and described, but can be modified in various ways without departing from the idea of the invention.

Preferably, motor 11 can be used to drive a hydraulic pump in common for all of the operating cylinders. The rotating movement of the mold table can be effected by means of such an operating cylinder which moves the table forward stepwise.

What I claim is:

A machine for the manufacture of slabs of casting mass such as concrete comprising, a mold turntable formed with a plurality of molds for the casting of slabs therein, a filling station and means at said filling station for filling each of said molds in succession with casting mass, a compressing and dehydrating station and means at said station for compressing and dehydrating the casting mass in said molds, and a discharge station and means at said discharge station for the removal of said slabs from said molds, means for rotating said mold turntable for moving each of said molds stepwise through said stations in succession, a magazine containing supporting discs for said slabs, a main conveyor leading from said magazine past said turntable to a drying chamber for conveying said discs carrying said slabs to said drying chamber, first transferring means located above said magazine and including an element movable from a position overlying said magazine to a position overlying said main conveyor, said element including means for engaging said supporting discs at the top of said magazine and for transferring said supporting discs from said magazine one at a time onto said main conveyor, second transferring means positioned adjacent said first transfer means and operative above said mold turntable and said main conveyor for transferring said pressed slabs one by one from said mold table onto supporting discs carried by said main conveyor, means for imparting a stepwise movement to said main conveyor in synchronism with the movement of said turntable and with the movement of said first and second transferring means, said magazine for said supporting discs comprising a turntable formed for the mounting of a plurality of piles of supporting discs thereon, and means for imparting a stepwise rotation to said magazine turntable so that when one of said piles of discs is used up another pile is brought into position to be transferred by said first transferring means.

References Cited in the file of this patent

UNITED STATES PATENTS

| | | |
|---|---|---|
| 929,981 | Price | Aug. 3, 1909 |
| 1,335,071 | Moussette | Mar. 30, 1920 |
| 1,959,512 | Wall et al. | May 22, 1934 |
| 2,692,418 | Besser | Oct. 26, 1954 |
| 2,716,265 | Webb | Aug. 30, 1955 |

FOREIGN PATENTS

| | | |
|---|---|---|
| 993,730 | France | July 25, 1951 |
| 1,062,188 | France | Dec. 2, 1953 |